Jan. 19, 1926.
S. B. MacLEOD
1,569,993
FISH LURE
Filed Nov. 20, 1924      2 Sheets-Sheet 1
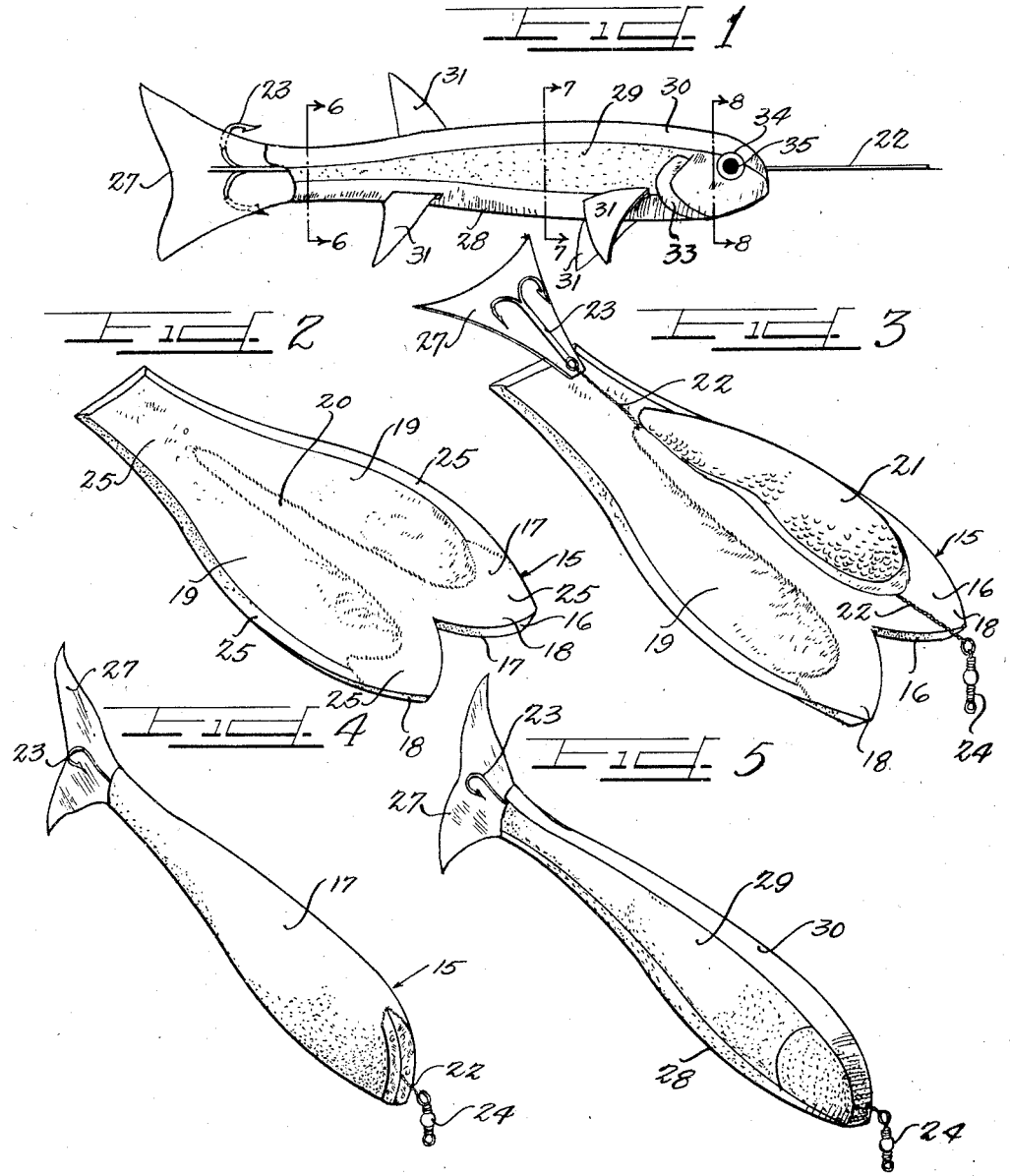
Inventor
Sidney B. MacLeod Jan. 19, 1926.
S. B. MacLEOD
1,569,993
FISH LURE
Filed Nov. 20, 1924      2 Sheets-Sheet 2
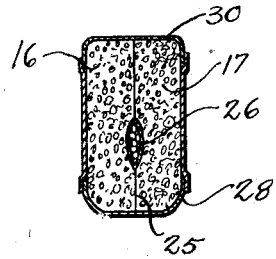
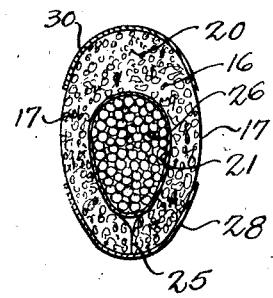
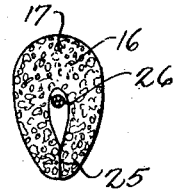
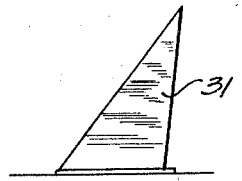
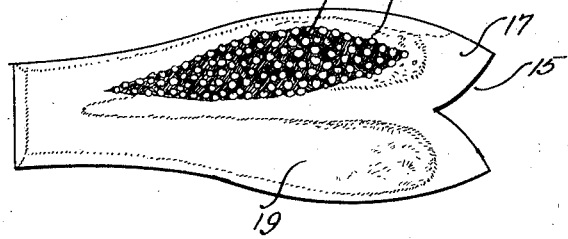
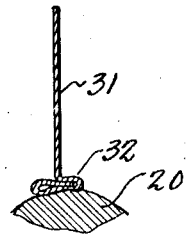
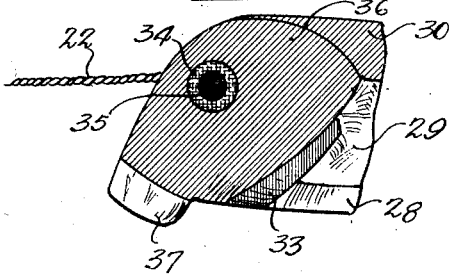
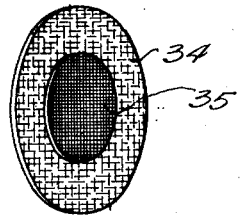
Inventor
Sidney B. MacLeod Patented Jan. 19, 1926.

1,569,993

UNITED STATES PATENT OFFICE.

SIDNEY B. MacLEOD, OF SOUTH CHICAGO, ILLINOIS.

FISH LURE.

Application filed November 20, 1924. Serial No. 750,995.

*To all whom it may concern:*

Be it known that I, SIDNEY B. MacLEOD, a citizen of the United States, and a resident of the city of South Chicago, in the county of Cook and State of Illinois, have invented certain new and useful Improvements in a Fish Lure; and I hereby declare that the following is a full, clear, and exact description of the same, reference being had to the accompanying drawings, and to the numerals of reference marked thereon, which form a part of this specification.

The invention relates to fish lures and the method of making them.

One of the objects is to provide a fish lure which possesses substantially the yielding consistency thruout, of a natural fish.

Another object is to provide a lure or bait which simulates a natural fish and which does not have any part that rigidly opposes the effort of a larger fish to seize or bite it, as evidenced by the resisting quality of a wooden minnow.

Another object is to provide a fish-simulating structure with flexible fins and tail, made of sheet rubber or the like, which are set in motion by movement of the lure thru the water and which are extremely yielding when seized by a larger fish and will resume their initial positions when released.

Another object is to provide a lure body of great buoyancy, which is soft, yielding and nonhygroscopic in its nature and which is tough and endurable.

Another object is to provide a method of making the lure.

Other objects, advantages and benefits of the invention will readily appear to persons skilled in the art from a consideration of the following description when taken in conjunction with the drawings forming a part hereof, wherein:—

Figure 1 shows a side elevation of a finished lure.

Figure 2 is a blank of suitable material of which the body part is made.

Figure 3 shows the aforesaid blank with the weight, and the hook and leader in place before folding.

Figure 4 shows the blank folded over and secured together at its confronting edges.

Figure 5 shows a further advance by attachment of a cap piece over the head.

Figure 6 is a transverse section taken on line 6—6 of Figure 1.

Figure 7 is a section taken on line 7—7 of Figure 1.

Figure 8 is a section taken on line 8—8 of Figure 1.

Figure 9 is a plan view, similar to Figure 3, showing the internal longitudinally extending flexible weighting body in place.

Figure 10 is a side elevation of one of the fins.

Figure 11 is a section thru the fin as it is applied to the lure.

Figure 12 is a modified form of head.

Figure 13 is an enlarged perspective of the eye simulating structure.

In all the views the same reference characters are used to distinguish like parts.

When a fish "strikes" a bait, or fish-like lure, if his teeth encounter a rigid hard body, such as a wooden minnow, a plug or a spoon, he immediately initiates an effort to disgorge it or to become disengaged therefrom, if perchance, he may have been hung to the hooks. When he feels this rigid substance, he does not "close down" upon it and the probability of hooking him is relatively remote. Should he find that he has taken into his mouth a yielding resilient body resembling a small fish he will immediately close his jaws whereupon the hooks will penetrate the tissue and the fish will be captured.

In a physical embodiment of the device about to be described the entire structure is yielding and resilient to an extent substantially corresponding with the body of a small fish.

I prefer to make the body of the bait of a material commercially known as caoutchouc mousse which is porous like sponge rubber and which is more buoyant than cork. This material is made in sheets and has an imperforate skin on each side and can hardly be distinguished from sponge rubber in appearance.

Figures 2, 3 and 9 show an unfolded flat blank 15 having a porous body 16 and imperforate skins 17—17. The blank shows two integral members 18—18, each having a longitudinally extending registerable cavity 19 with a central dividing rib 20. The rib 20 forms the back portion of the body when the members are folded together, as will be hereinafter explained.

The cavities form jointly a receptacle to receive the weighting body.

The weighting body should be yielding and resilient as a whole so as to not contribute any rigidity to the body part of the structure.

I have made a very satisfactory weighting body 26 by embedding ordinary gun shot in a body of jelly-like plastic material, such for example as rubber cement, molding it into form, then vulcanizing it to a slight extent so that the conglomerate will have and retain its yielding resilient qualities. Such a mass is shown in Figure 9.

In substitution of this form of weighting structure I may make a small closed sack 21 of sheet rubber and of proper shape, Figure 3, and place the shot therein.

The weighting body of either type or a substantial equivalent thereof is placed in one of the cavities 19. A flexible leader 22 having a triple hook 23 secured to one end and a swivel 24 to the other end, is placed as shown in Figure 3.

The two members 18—18' are now folded one over the other about a plane passing thru the internal rib 20, and the edges 25 are cemented together as shown in Figure 4 with the weighting body 26 enclosed. Before the members are folded and cemented together, the tail 27 is cemented to the rear end of the blank, as shown in Figure 3. This tail and also the fins are made of pure sheet rubber, or such similar material, which is very flexible and resilient and which is preferably more or less translucent when in water.

A thin strip 28 of rubber or rubber-like material may be cemented to the body to bridge the joint between the adhering edges 25. This belly strip may be of contrasting color with the sides 29 and another strip 30 of darker color may be cemented to the body part, or this part of the structure may be painted, or both.

A fin 31 is shown in elevation in Figure 10. It is cut from a sheet of pure gum rubber and its base portion 32 is folded and cemented along the folds to provide a surface to be cemented to the body part of the fish. These fins are attached to the body substantially as shown in Figure 1.

Pieces of red sheet rubber or similar substances may be cemented to the head to form gill-like members 33, or this part of the head may be painted with an appropriate color.

In making the eye-like feature of the fish I provide a relatively large disk 34, which may be made of appropriately colored gum rubber, say yellow, and I cement this to the head, one on each side, and over this disk in axial or concentric relation therewith a smaller disc 35 is cemented, this latter and smaller disc may be black or red to simulate the appearance of the eye of a natural fish.

In Figure 12 I have shown as a modification a simulation of the head of a black sucker. This is accomplished by the overlying head cover 36 and the nose 37.

The belly surface 28 may be white or cream color. The sides 29 may be painted with aluminum paint to produce a shiner effect and the back 30 and part of the head may be made a reddish brown in color.

The weighting body 26 is placed in the body so as to produce and preserve low center of gravity which causes the fish to float always right side up. The weighting body will readily yield when the body is compressed and the shifting particles will return to their normal positions when the compressing means has been withdrawn.

Other lures, such as frogs, crawfish, hellgramites and the like may be made in the manner described and with corresponding advantages.

Having described the invention, what I claim as new and desire to secure by Letters Patent is:—

1. A fish lure, comprising a fish-like structure having throughout substantially the yielding resilient qualities of a natural fish, and a weighting mass therein substantially as yielding as the body part of the lure.

2. A fish lure, comprising a yielding resilient body part, and a weighting body therein, said weighting body being composed of a plurality of heavy small particles held in a mass by resilient means.

3. A fish lure, comprising a yielding resilient body part, and a weighted body composed of a plurality of shot held in a jelly-like mass by a resilient cementitious adhesive.

In testimony whereof I have hereunto subscribed my name.

SIDNEY B. MacLEOD.